United States Patent
Ali Vehmas et al.

(10) Patent No.: US 6,223,052 B1
(45) Date of Patent: Apr. 24, 2001

(54) RADIO TELEPHONE WITH REMOVABLE MEMORY MODULES AND MODULE PRIORITIZATION

(75) Inventors: Timo Ali Vehmas; Heikki Huttunen, both of Salo (FI); Timothy John Frain, Camberley (GB)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 08/099,709

(22) Filed: Jul. 29, 1993

(30) Foreign Application Priority Data

Aug. 3, 1992 (GB) .................................................. 9216475

(51) Int. Cl.$^7$ ........................................................ H04B 1/38
(52) U.S. Cl. ............................................. 455/551; 455/575
(58) Field of Search ............................... 455/89, 90, 33.2, 455/347, 348, 349, 33.1, 550, 551, 557, 575, 186.1; 379/357, 58, 59

(56) References Cited

U.S. PATENT DOCUMENTS

| | | | |
|---|---|---|---|
| 4,677,653 | * 6/1987 | Weiner et al. | 455/33.2 |
| 4,742,560 | * 5/1988 | Arai | 455/33.1 |
| 5,185,788 | * 2/1993 | Matsamoto | 379/357 |
| 5,257,414 | * 10/1993 | Trahan et al. | 379/357 |
| 5,331,123 | * 7/1994 | Kimbell et al. | 455/89 |
| 5,349,697 | * 9/1994 | Pelkonen | 455/89 |
| 5,353,328 | * 10/1994 | Jokimies | 455/90 |

FOREIGN PATENT DOCUMENTS

| | | | |
|---|---|---|---|
| 3611301 | 12/1987 | (DE) . | |
| 3838677 | * 5/1990 | (DE) | 455/89 |
| 0369110 | 5/1990 | (EP) . | |
| 0378450 | * 7/1990 | (EP) | 455/89 |
| 1366372 | 9/1974 | (GB) . | |
| 2241133 | 8/1991 | (GB) . | |
| WO 90/06648 | 6/1990 | (WO) . | |
| WO 92/19078 | 10/1992 | (WO) . | |

OTHER PUBLICATIONS

Owners Manual Pat Board (V–7,2), pp. 1–26, Jul. 17, 1989.*

\* cited by examiner

*Primary Examiner*—Thanh Cong Le
(74) *Attorney, Agent, or Firm*—Perman & Green, LLP

(57) ABSTRACT

A radio telephone arrangement comprises two or more card readers (10,11,13) for accommodating a corresponding number of memory cards (SIM1, SIM2, SIM3) e.g. in the form of subscriber identity modules (SIMs). The various card readers may be designed to accept memory cards having different physical formats. The telephone is adapted to use the information from one of the memory cards (to the exclusion of the other memory cards) in accordance with a predetermined priority allocation. The prioritization may be re-set automatically if a card or card reader is removed or inserted. Preferably the user may also modify the priorities, e.g. by menu selection.

8 Claims, 1 Drawing Sheet

RADIO TELEPHONE WITH REMOVABLE MEMORY MODULES AND MODULE PRIORITIZATION

This invention relates to a radio arrangement and, more particularly, to a radio arrangement including means for removably receiving a memory module for storing information.

BACKGROUND OF THE INVENTION

It is known in the field of cellular radio telephones, for example, to use a memory module such as a data card which may be removably inserted into the telephone. Data, such as identity information, is read from the inserted card and used in the subsequent operation of the telephone. By way of example European Patent Application EP-A-0,369,110 discloses a mobile radio telephone having a handset into which a data card storing subscriber-related information is insertable for transferring information from the data card to the working memory of the telephone.

The data card may be, for example, a so-called "smart-card" which is similar in size to a conventional plastic credit card and which includes a memory implemented as an integrated circuit device, commonly referred to as a "chip", in which information is stored. For this reason such cards are also often known as "chip cards".

In addition to subscriber identity information, such as the subscriber telephone number, and personal identification number (PIN), the smart card may store for example, call charge information (i.e. a charge meter), a telephone number index, or false PIN entries. As memory capacity expands in smaller chip sizes, more applications can be implemented on one smart card. Accordingly, it is envisaged that in future multipurpose smart cards will cover an even wider range of applications than personal identification and datastorage services.

Indeed, in modern telecommunication systems, the applications for smart cards is expanding. One such application in this field is the so-called subscriber identity module (SIM) proposed for the pan-European digital cellular radio telephone system known as GSM (Group Speciale Mobile). For more information about the SIM proposed for GSM, reference is invited to the European Telecommunications Standards Institute (ETSI) Recommendation GSM 11.11 which describes the technical SIM specifications and Recommendation GSM 02.17 for the functional characteristics of the SIM.

There are currently two different mechanical standards proposed for the GSM SIM card and it is probable that a third will evolve. The functionality of the SIM is the same for all sizes, it is essentially that the physical dimensions are different. At present the two standards are (a) a credit card size SIM, and (b) a plug-in SIM about 20 mm×25 mm. The proposed third standard is likely to be a mid-sized SIM about half the size of a regular credit card. The rationale behind the different sizes is that the credit card size is perceived as a convenient size for the user from a practical standpoint. However, the credit card size is relatively large, and smaller card sizes are needed as miniaturization continues to drive down the overall size of the terminal (i.e. the radio telephone unit itself). The plug-in SIM is intended to be semi-permanently installed in the cellular telephone.

In future it is envisaged that compatibility problems are likely to arise when several different sizes of SIM are in wide use, because the SIM receiving device in a particular terminal will generally be designed to accept only one SIM type.

SUMMARY OF THE INVENTION

According to the present invention there is provided a radio arrangement including first receiving means for removably receiving a first memory module for storing information, second receiving means for removably receiving a second memory module for storing information, and information processing means adapted to use preferentially the information from one of the memory modules in accordance with a predetermined prioritization of said first and second receiving means.

As used in the present context, the term "memory module" includes a data card (such as a smart card (IC card) or a magnetic card), and other forms of package enclosing or carrying a memory device. The data card may be a passive memory card, i.e. essentially a read only memory (ROM), or an active processor card, i.e. capable of processing information internally within the card.

A radio arrangement in accordance with the invention has the advantage of being able to accept two or more different memory modules, but in a discriminatory fashion so that if two (or more) memory modules are present simultaneously it will be determined automatically which one will be used in preference to the other(s). Hence, the two data modules may contain different, possibly conflicting, items of data, but of the same data type, and the radio arrangement in accordance with the invention will have the capacity to automatically select one of the data items in preference to the other, so avoiding the conflict. For example, one memory module may have a first identity number (e.g. a subscriber number) assigned to it, and another memory module may have a second identity number assigned to it. When both modules are used simultaneously, i.e. in the respective receiving means, the radio arrangement in accordance with the invention will be operable with only one of the identity numbers, since the information processing means will use preferentially the information from that memory module which is present in the receiving means assigned the highest priority.

Moreover, the first receiving means may be capable of accepting a first type of memory module (i.e. a first size, shape or standard), while the second receiving means may accept a second type of memory module (i.e a second size, shape or standard). Thus a radio arrangement in accordance with the invention may be compatible with different memory module types, which is particularly beneficial when there is more than one standard module available for the same application, as in the case of the GSM SIM card mentioned above.

The information processing means and the first receiving means may be provided in the same housing, e.g. the transceiver housing. Alternatively, the first receiving means may be provided in a separate housing, e.g. in a handset, or in a cradle housing on which the handset is stored when not in use. In this latter case a coupling is provided to enable information to be transferred between the first memory module (when present in the first receiving means) and the information processing means.

The second receiving means may also be present in a separate, e.g. a dedicated, housing, and in this case a coupling is provided to enable information to be transferred between the second memory module (when present in the second receiving means) and the information processing means.

In one particular embodiment the first receiving means may be associated with a first radio, and the second receiving means may be associated with a second, independent radio. It is noted here that European patent EP-B-0,378,450 and European patent application EP-A-0,310,876 disclose that two radio telephones maybe interconnected such that the subscriber number of one is transferred to the other for subsequent communication. In that case, however, the subscriber numbers are stored in a respective number assignment module (NAM) internally within each radio, and the NAMs are not designed to be removable.

In a preferred embodiment the predetermined prioritization of the first and second receiving means may be modified according to circumstances. In one case the prioritization may be modified automatically depending on the condition of the radio. For example, if two receiving means are present the initial prioritization may be that the first receiving means takes priority over the second. However, if a third receiving means is added, the prioritization may be modified so that the third receiving means takes the highest priority. In a second case the prioritization may be modified manually by the user, e.g. by menu selection using the user interface (i.e. keypad and display) of the radio.

Suitably, means are provided for indicating which receiving means contains a memory module whose information is being used by the information processing means. This indication may be given as a message on the display of the radio. Alternatively each of the receiving means may be provided with a respective visual display element, e.g. a light source, which is illuminated to indicate which memory module is currently in use.

BRIEF DESCRIPTION OF THE DRAWINGS

An embodiment of the invention will now be described, by way of example, with reference to the accompanying drawing, in which:

the single FIGURE illustrates schematically a radio telephone arrangement in accordance with the present invention.

DETAILED DESCRIPTION OF THE INVENTION

Figure 1:
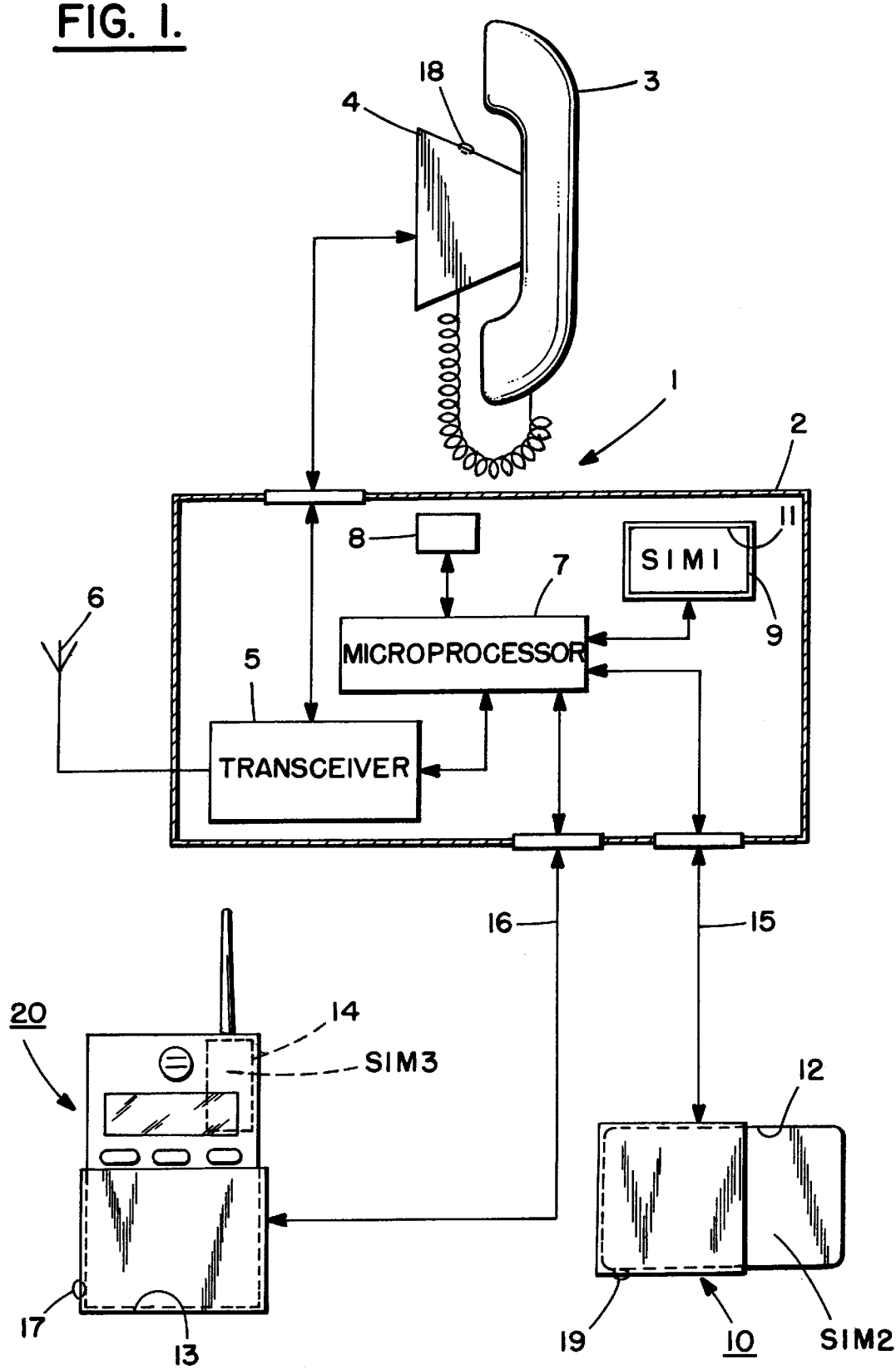

The radio arrangement shown in the FIGURE comprises a mobile cellular radio telephone for use on the GSM network, which includes a transceiver housing 2 and a handset 3 removably mounted on a cradle 4. The handset 3 is connected to the cradle 4 by a curly cord, in a conventional manner. Suitably the transceiver housing is mounted in the boot (trunk) of a vehicle and the handset and cradle are mounted in the interior passenger compartment.

The housing 2 encloses a transceiver 5 connected to an external antenna 6 and coupled to an internal microprocessor 7. The transceiver 5 and microprocessor 7 are coupled to the handset 3 via the cradle 4, as shown. The program instructions for operating the telephone are stored in a memory device 8, e.g. a ROM,RAM or EEPROM, coupled to the microprocessor 7.

Subscriber related data (e.g. subscriber number, system ID, system channel scan data and serial number) is stored in a first SIM 9 (SIM1) which can be removably inserted in the housing 2. In this embodiment the SIM 9 is of the smaller plug-in type specified as a GSM standard. An area 11 in the housing is reserved for receiving the SIM 9 and is designed so that the SIM 9 can be plugged in or removed in a relatively straightforward manner. The area 11 may be in the form of a recess or compartment. The SIM 9 may also contain other information or applications, e.g. repertory dialing information, charge meter information, function control information, an authentication algorithm etc. It is noted here that the GSM SIM card is not a passive memory card, but a so-called processor card which includes not only a memory, but a facility for internally processing information, as is well known in the art. The data stored in the SIM is used by the microprocessor 7 to enable the telephone to communicate on the GSM network. Other data stored on the SIM is used by the microprocessor e.g. to control, modify, or monitor the operation of the telephone in conventional manner. A light emitting diode (LED) 18 located on the cradle 4 is illuminated to indicate when the microprocessor 7 is using information from SIM1. The LED indicator may alternatively be located on the handset 3 or housing 2.

It is not necessary for the SIM 1 to be accommodated in the housing 2. It may alternatively be accommodated in the cradle 4, in the handset 4, or in a separate, external card reader analogous to the independent card reader 10 described below.

A second SIM card 12 (SIM2) may be inserted into a separate card reading device 10. SIM2 contains a different set of data to SIM1 and may be of a different type to SIM1. In the present embodiment the SIM card 12 is the larger credit card size specified as a GSM standard. The card reader 10 may be implemented in accordance with the aforementioned European patent application EP-A-0,494,503 to which reference is again invited. Other very suitable forms of card reader for this purpose are disclosed in European patent application EP-A-0,351,103 and European patent EP-B-0,325,458 to which reference is also invited.

The external card reader 10 is coupled to the microprocessor 7 in the transceiver housing 2 via a data bus 15 and a conventional protocol may be used for transferring data from the second SIM card 12 to the microprocessor 7. A light emitting diode (LED) 19 on the card reader 10 is illuminated to indicate when the microprocessor 7 is using information from SIM2.

In the present arrangement a facility is also provided for coupling an independent portable radio telephone 20 to the mobile telephone 1, such that when the portable is connected the mobile may adopt data from the portable. To this end a holder 13 is provided for receiving the portable telephone 20. The holder 13 may be mounted, for example, in a convenient location in the passenger compartment of the vehicle. The portable telephone 20 is provided with a third SIM card 14 (SIM3) containing a further set of data.

The holder 13 is coupled to the microprocessor 7 in the transceiver housing 2 via a data bus 16 and a conventional protocol may be used for transferring data from the third SIM card 14 in the portable telephone. LED 17 on the holder 13 is illuminated to indicate when the microprocessor 7 is using information from SIM3.

In use, the microprocessor 7 periodically monitors which of the SIM cards SIM1, SIM2, SIM3 are present. If only one SIM card is present then the microprocessor will use the data from that particular SIM card for the operation of the mobile telephone. If all of the card readers are found to be empty, i.e no SIM cards are present, the telephone will not operate except, perhaps, for emergency service calls.

On the other hand if two or more SIM cards are found to be present simultaneously, the microprocessor 7 will use data from one of the cards only in accordance with a predetermined priority sequence for the various card readers. The priority list is stored, for example, in the memory 8. Thus in the present case, the default prioritization, in descending order of priority is;

1. Portable Telephone Holder (13)=SIM3
2. External Card Reader (10)=SIM2
3. Internal Card Reader (11)=SIM1

Hence, if a portable telephone 20 is present in the holder 13 the mobile telephone will become operable with the data from SIM3 in the portable telephone 20. If there is no portable telephone in the holder 13, but a SIM card 12 (SIM2) is present in the external card reader 10, the mobile telephone will become operable with the data from SIM2 in the card reader 10. If there is neither a portable telephone in the holder 13, nor a SIM card in the external reader 10, but a SIM card 9 (SIM1) is present in the housing 2, the mobile telephone will be operable with the data from SIM1.

In addition to the periodic monitoring of which SIM cards are present, the system automatically checks the situation and re-prioritizes whenever a SIM card is inserted or removed, or whenever the external card reader 10, or the telephone holder 13 are connected to or disconnected from the mobile telephone. However, if a new SIM card is inserted during a call, any new prioritization will not become effective until the current call is terminated.

The prioritization sequence may be fixed. However, it is preferable if the priority can be varied by the user. Suitably this may be achieved by menu selection with the aid of the user interface on the mobile. More specifically, by depressing the keys on the mobilehandset 3 the user may enter a menu mode in which the option becomes available to reset the priority levels. To this end, one of the keys on the handset 3 may include a menu or function key, suitably labeled, as is usual in such telephones. Depression of this key permits a variety of pre-set menus, the related instructions of which may be stored in the memory 8, to be viewed on a display and selectively enabled. The various menus may be selected by pressing appropriate keys on the keypad after pressing the menu key. The relevant menu is shown to the user in words or abbreviations on the display. For example, it is known that the user may select the ring tone by appropriate menu selection. More sophisticated options may also be available via the menu facility.

In this embodiment a special menu is provided to permit manual modification of the card reader priorities. For example the name of the different card receiving devices may be shown on the display and the user may choose the relative priority levels by appropriately pressing keys on the keypad.

So, for example, the display may first show "PORTABLE", in response to which the user may press the key "2". The display may then shown "EXTERNAL SIM", in response to which the user presses the key "1".

Finally the display shows "INTERNAL SIM", and the user presses "3". The new priority sequence is thus set as follows, in descending order:

1. External Card Reader (10)=SIM2
2. Portable Telephone Holder (13)=SIM3
3. Internal Card Reader (11)=SIM1

It may be possible to set two card readers with the same priority level. However, in this case, if SIM cards are found to be present in both devices having the equivalent priority level, a message will be displayed indicating to the user that an error has occurred or that there are conflicting priorities, and inviting the user to resolve the conflict by manually selecting which card should take precedence.

In view of the foregoing description it will be evident to a person skilled in the art that various modifications may be made within the scope of the present invention. For example, the facility for coupling an independent portable telephone may be dispensed with. Moreover, the "external" card reader 10 described above may alternatively be integrated with the mobile telephone apparatus, and may for example be incorporated in the cradle 4 or in the handset 3. On the other hand the "external" card reader may be associated with other apparatus such as a data terminal or a personal computer. Furthermore, the "internal" card reader 11 described above need not be enclosed within the main transceiver housing 2, but may instead be implemented externally in the same manner as the external card reader 10. Also, some or all of the card readers may be capable of accepting SIM cards of the same type, standard or format. Finally, it is noted that a radio arrangement in accordance with the invention may be used not only with two or three card readers but with any higher number of card readers capable of accepting a corresponding number of SIM cards.

What we claim is:

1. A radio arrangement comprising:

first receiving means having a first area for removably receiving a first memory module for storing information;

second receiving means having a second area for removably receiving a second memory module for storing information;

information processing means for automatically alternatively using information from either the first module in the first area or the second module in the second area based upon a predetermined prioritization of said first and second receiving means, and means for modifying the predetermined prioritization of said first and second receiving means.

2. A radio arrangement as claimed in claim 1, wherein the modifying means are adapted automatically to modify the prioritization of said first and second receiving means depending on the condition of said radio arrangement.

3. A radio arrangement as claimed in claim 1, wherein the modifying means includes means for manually modifying the prioritization of said first and second receiving means.

4. A radio telephone system comprising:

a first unit having a microprocessor, a memory and a first memory module removably connected to a housing of the first unit;

a second unit having a second memory module, the second memory module being operationally connected to the microprocessor of the first unit; and means for selecting data for use with the microprocessor from either the first memory module or the second memory module based upon a priority sequence in the memory of the first unit.

5. A system as in claim 4 further comprising means for changing the priority sequence in the memory.

6. A system as in claim 4 further comprising a portable telephone holder operably connected to the first unit, the holder being adapted to transfer data from a third memory module of a portable telephone located in the holder to the microprocessor of the first unit.

7. A system as in claim 6 wherein the second unit comprises an independent card reader that is operably connected to the first unit.

8. A system as in claim 4 wherein the means for selecting automatically selects a memory module to be used based upon whether the first memory module is connected to the first unit.

* * * * *